(12) United States Patent
Rogers et al.

(10) Patent No.: US 11,642,981 B1
(45) Date of Patent: May 9, 2023

(54) CHARGING EV BATTERY USING PARALLEL BUCK AND BOOST CONVERTERS

(71) Applicant: FREEWIRE TECHNOLOGIES, INC., Newark, CA (US)

(72) Inventors: Aaron Rogers, Newark, CA (US); Nathan Biesterfeld, Newark, CA (US); Nikola Milivojevic, Newark, CA (US)

(73) Assignee: FREEWIRE TECHNOLOGIES, INC., Newark, CA (US)

( * ) Notice: Subject to any disclaimer, the term of this patent is extended or adjusted under 35 U.S.C. 154(b) by 0 days.

(21) Appl. No.: 17/821,368

(22) Filed: Aug. 22, 2022

Related U.S. Application Data

(60) Provisional application No. 63/391,703, filed on Jul. 22, 2022.

(51) Int. Cl.
*H02J 7/00* (2006.01)
*B60L 58/18* (2019.01)
*H02J 7/34* (2006.01)
*H02M 1/00* (2006.01)
*H02M 3/158* (2006.01)
*B60L 50/60* (2019.01)

(52) U.S. Cl.
CPC .............. *B60L 58/18* (2019.02); *B60L 50/60* (2019.02); *H02J 7/00714* (2020.01); *H02J 7/342* (2020.01); *H02M 1/0009* (2021.05); *H02M 3/1582* (2013.01); *B60L 2210/10* (2013.01); *B60L 2210/12* (2013.01); *B60L 2210/14* (2013.01); *H02J 2207/20* (2020.01)

(58) Field of Classification Search
CPC ...... B60L 58/18; B60L 50/60; B60L 2210/10; B60L 2210/12; B60L 2210/14; H02J 7/00714; H02J 7/342; H02J 2207/20; H02M 1/0009; H02M 3/1582
USPC .................................................. 320/103, 104
See application file for complete search history.

(56) References Cited

U.S. PATENT DOCUMENTS

2013/0106342 A1* 5/2013 Iwata ...................... B60L 58/20
320/101
2020/0359123 A1* 11/2020 Li .......................... H02J 7/022

* cited by examiner

*Primary Examiner* — Zixuan Zhou
(74) *Attorney, Agent, or Firm* — Marshall, Gerstein & Borun LLP

(57) ABSTRACT

Controlling a charging current while transferring energy from a source battery to a target battery in an electric vehicle (EV) includes operating, by control circuitry, a buck converter at a fixed switching frequency to transfer power from the source battery to the target battery, in a first operational mode; in response to detecting a first trigger event, transitioning from the first operational mode to a second operational mode to operate the buck converter at a variable switching frequency; and in response to detecting a second trigger event, transitioning to a third operational mode to activate a boost converter coupled to the source battery and the target battery.

8 Claims, 5 Drawing Sheets

CHARGING EV BATTERY USING PARALLEL BUCK AND BOOST CONVERTERS

CROSS-REFERENCE TO RELATED APPLICATION

This application claims priority to U.S. Provisional Patent Application No. 63/391,703, titled "Charging EV Battery Using Parallel Buck and Boost Converters," filed on Jul. 22, 2022, the disclosure of which is incorporated by reference herein in its entirety.

FIELD OF THE DISCLOSURE

This disclosure relates to high-power charging devices and more particularly to techniques for controlling the charging current for an electric vehicle (EV) using parallel buck and boost DC-to-DC converters.

BACKGROUND

Electric vehicles (EVs) and plug-in hybrid vehicles can operate without the use, or with only limited use, of hydrocarbon-based fuels. These vehicles generally are equipped with rechargeable batteries and circuitry for receiving charging current from a charging station. Transferring electric energy from a storage device at a charging station, such as a stationary battery, to the battery of an EV continues to present multiple technical challenges.

One of these challenges is controlling the charging current that flows from the stationary battery of the charging station via the control circuitry to the battery of the vehicle. Keeping the charging current below a low threshold prolongs the charging process; on the other hand, excessively high charging current can damage the battery of the vehicle and/or the control circuitry.

SUMMARY

Using the techniques of this disclosure, a system efficiently controls the charging current when transferring electric energy from a source energy storage device to a target energy storage device. The energy storage devices can be batteries, for example. The system utilizes a buck DC-to-DC converter and a boost DC-to-DC converter (or simply "buck converter" and "boost converter," respectively) connected in parallel between the source battery and the target battery. The system can include a controller that in different operational modes can cause the buck converter to operate at a fixed switching frequency or a variable switching frequency, and can cause the boost converter to operate at a fixed switching frequency or a variable switching frequency. The system can transition between the different operational modes of the buck and boost converts in response to certain trigger events, such as the voltage differential between the source and target batteries reaching a certain level, or the duty cycle of the converter reaching a certain level. Further, the system can activate the deactivate the buck and boost converters at different times, in response to certain trigger events.

One example embodiment of these techniques is a method for controlling a charging current while transferring energy from a source battery to a target battery. The method includes operating, by control circuitry, a buck converter at a fixed switching frequency to transfer power from the source battery to the target battery, in a first operational mode; in response to detecting a first trigger event, transitioning from the first operational mode to a second operational mode to operate the buck converter at a variable switching frequency; and in response to detecting a second trigger event, transitioning to a third operational mode to activate a boost converter coupled to the source battery and the target battery.

Another example embodiment of these techniques is a circuit for controlling a charging current while transferring energy from a source battery to a target batter. The circuit includes a buck converter configured to couple to the source battery and the target battery; a boost converter configured to couple to the source battery and the target battery; a boost switch that connects an output to the boost converter to the target battery in a closed state, and disconnects the boost converter from the target battery in an open state; and control circuitry configured to: (i) operate the buck converter at a fixed switching frequency in a first operational mode, (ii) in response to detecting a first trigger event, transition from the first operational mode to a second operational mode to operate the buck converter at a variable switching frequency, and (iii) in response to detecting a second trigger event, transition to a third operational mode to activate the boost converter.

Yet another example embodiment of these techniques is a charging station comprising a source battery and a circuit for controlling a charging current while transferring energy from the source battery to the target battery. The circuit includes a buck converter configured to couple to the source battery and the target battery; a boost converter configured to couple to the source battery and the target battery; a boost switch that connects an output to the boost converter to the target battery in a closed state, and disconnects the boost converter from the target battery in an open state; and control circuitry configured to: (i) operate the buck converter at a fixed switching frequency in a first operational mode, (ii) in response to detecting a first trigger event, transition from the first operational mode to a second operational mode to operate the buck converter at a variable switching frequency, and (iii) in response to detecting a second trigger event, transition to a third operational mode to activate the boost converter.

DETAILED DESCRIPTION OF THE DRAWINGS

Figure 1:
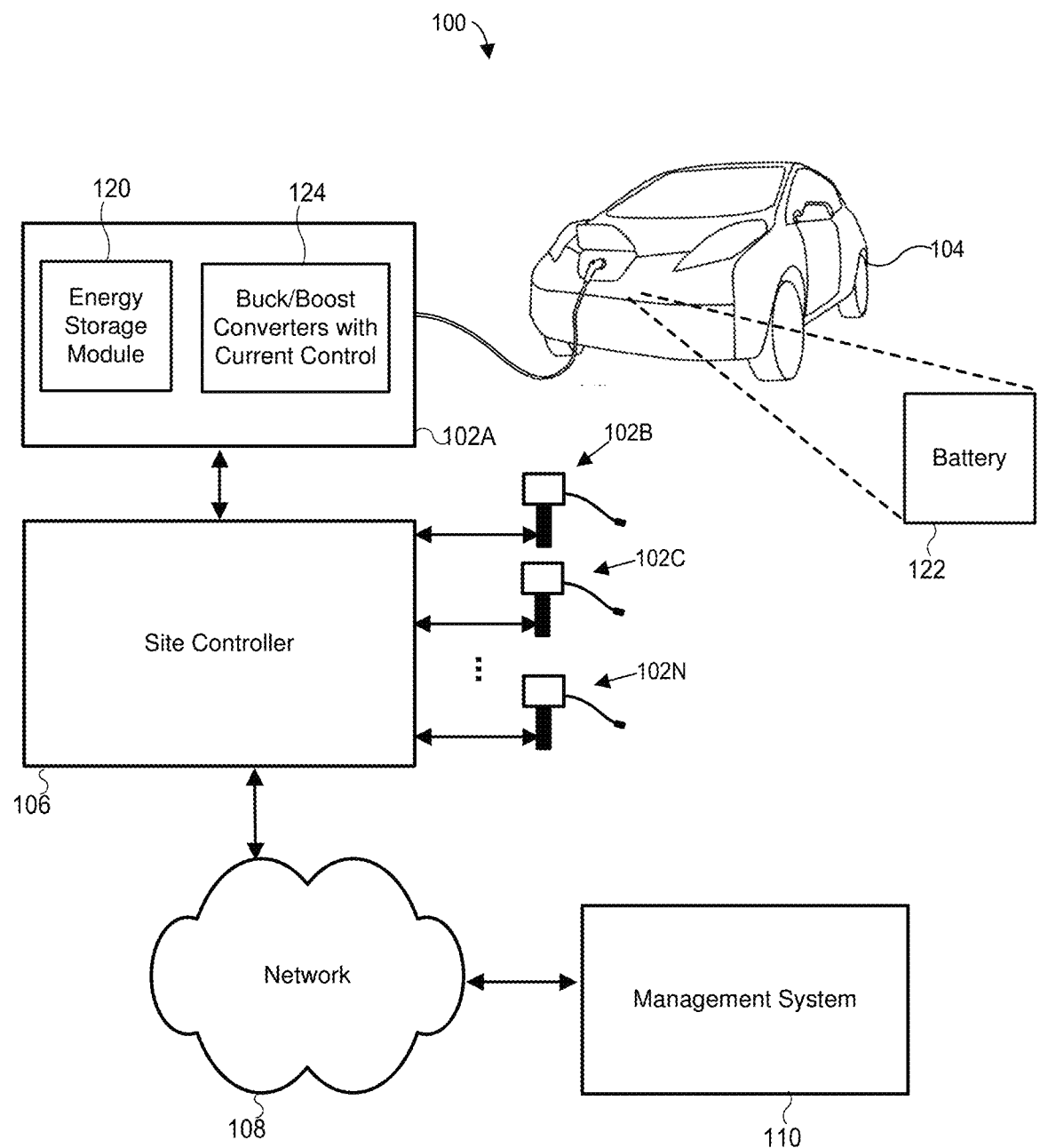
FIG. 1 is a block diagram of an example environment in which a charging station can implement the techniques of this disclosure for controlling the charging current when transferring electric energy from a source energy storage device to a target energy storage.

FIG. 1 illustrates an example environment 100 in which the techniques for controlling the charging current when transferring electric energy between batteries or other suitable energy storage devices can be implemented. The environment 100 includes EV charging stations 102A, 102B, 102C, . . . 102N located at the same site. The charging stations 102A-102N can be communicatively coupled to a site controller 106, which in turn can be communicatively coupled to a management system 110 via a communication network 108, which can include wired and/or wireless communication links. The charging stations 102A-102N can be spread over a wide geographical area, a few city blocks, or collocated on a single campus or in or proximate to a building.

The management system 110 may be accessible to operators of the charging stations 102A-102N, electrical utilities that supply EV charging stations, owners or users of EVs and third-party service providers. In various implementations, the management system 110 manages loads applied to an electrical grid by the charging stations, monitors and/or predicts demand for access to the charging stations, provides availability information to third-party providers such as mapping services, rental agencies, etc.

The charging station 102A includes an energy storage module 120, which cane be a stationary battery, and a circuit 124 configured to control the charging current with a buck converter and a boost converter. The circuit 124 is discussed in more detail below with reference to FIGS. 2 and 3.

In operation, the charging station 102A controls the transfer of electric energy to a battery 122 of an electric vehicle (EV) 104, which in this example is illustrated as an electric passenger car, but in general can be any suitable type of a road vehicle, a two-wheeler, a railway vehicle, a boat, an aerial vehicle, etc. Further, an EV as used in this disclosure also can refer to a hybrid vehicle which includes an internal combustion engine.

In an example implementation, as the voltages across the batteries 120 and 122 become close, and the stationary battery 120 is only 5-10V higher than the EV battery 122, the circuit 124 executes a certain set of operations (an algorithm) to make a transition from the buck converter processing power to the boost converter processing power. The algorithm facilitates the transition while continuously maintaining control over the EV battery charging current.

As discussed in more detail below, when the voltage differential between the stationary and EV battery is sufficiently small, the buck converter can operate at 99% duty cycle while maintaining control of EV battery charging current. Due to the high switching frequency of the buck converter (>100 kHz), it is generally difficult to achieve the discrete duty cycle resolution necessary for maintaining control of the charging current. Thus, to increase the resolution as the duty cycle gets closer to 100%, the buck controller switches to a variable-frequency control strategy according to which the switching frequency becomes smaller (e.g., in the 100 Hz-10 kHz range). This transition allows the buck controller to achieve a duty cycle closer to 100% and maintain control over the charging current.

When the battery voltages become substantially equal, and/or the duty cycle of the power control signal from the buck controller becomes 100%, the buck converter operates in the pass-through mode, and thus the stationary battery is directly connected to the EV battery. At this point, the system controller can activate the boost converter to compensate for the difference between the desired charging current and the decaying buck current flowing to the target battery. The buck converter then achieves the extremely low duty cycles (e.g., near 0%) initially required by the boost using a similar variable-frequency control strategy.

After the decaying current through the pass-through switch of the buck converter reaches zero, and thus the boost converter begins to supply the entirety of the charging current, the system controller can deactivate the buck converter. When the difference between the two battery voltages begins to increase, the switching frequency of the boost converter increases. The system controller can return to a nominal constant-frequency PWM control and charging after the two battery voltages are sufficiently far apart.

Figure 2:
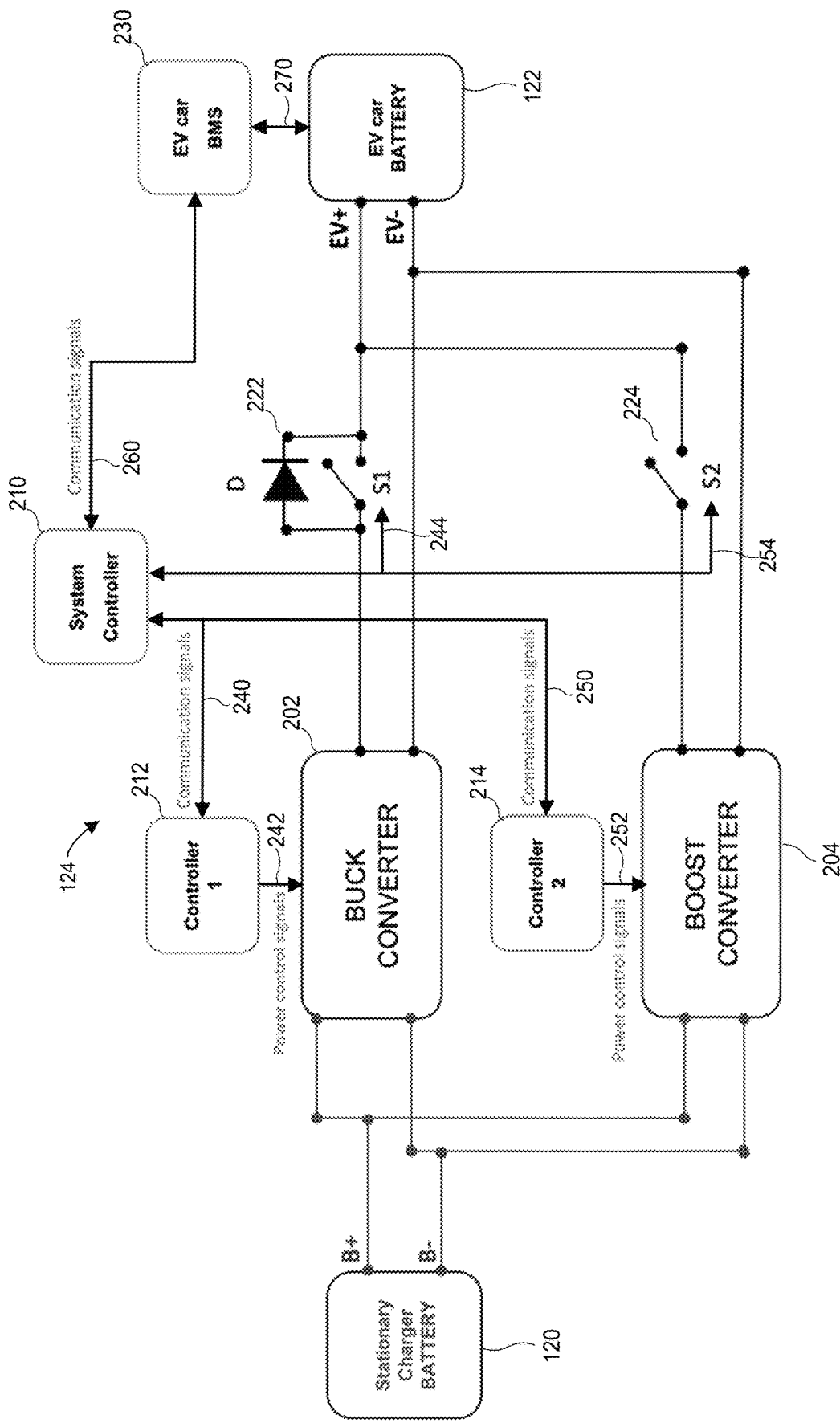
FIG. 2 illustrates an example circuit of the charging station of FIG. 1 coupled to a stationary battery and an electric vehicle (EV) battery.

Now referring to FIG. 2, the circuit 124 in an example implementation includes a buck converter 202 coupled to the stationary battery 120 as an input, and to the EV battery 122 as an output. The circuit 124 further includes a boost converter 204 connected in parallel to the buck converter 202, and thus similarly coupled to the stationary battery 120 as an input, and to the EV battery 122 as an output. A system controller 210 controls the time and the activation mode of the converters 202 to 204. To this end, the system controller 210 opens or closes, via a signal line 244, a switch 222 to connect or disconnect the buck converter 202 to or from the EV battery 122. The switch 222 in this example implementation includes a diode for redundancy.

Further, the system controller 210 opens or closes, via a signal line 254, a switch 224 to connect or disconnect the boost converter 204 to or from the EV battery 122. The system controller 210 can exchange communication signals with an EV carry battery management system (BWM) 230 via a communication link 260. The system controller 210 can thus obtain the charging information related to the EV battery 122, from the vehicle. Still further, the system controller 210 in this implementation exchanges information with a buck controller 212, via a communication link 240, and a boost controller 240, via a communication link 250. The buck controller 212 provides power control signals to the buck converter 202 via a link 242, and the boost controller 214 provides power control signals to the boost converter 204 via a link 252.

Each of the controllers 210, 212, and 214 can include one or more processors such as microprocessors, microcontrollers, digital signal processors (DSPs), field programmable gate arrays (FPGAs), programmable logic devices (PLDs), state machines, gated logic, discrete hardware circuits, and other suitable hardware configured to implement the corresponding logic. In some implementations, the one or more processors of the controller 210, 212, or 214 execute software, which can include instructions or code in any suitable programmable language, at any suitable level. In general, each of the controllers 210, 212, and 214 can be implemented in hardware, software, firmware, or any suitable combination of hardware, software, or firmware.

The controllers 212 and 214 can provide power control signals to the buck and boost converters 202 and 204, respectively, which nominally cane be in the form of PWM, with switching frequencies higher than 10 kHz. The PWM power control signals carry duty cycle information in the range of 0 to 100%, where 0% corresponds to the power switch of the respective power converter being OFF, while 100% duty cycle corresponds to the power switch of the respective power converter being ON.

Figure 3:
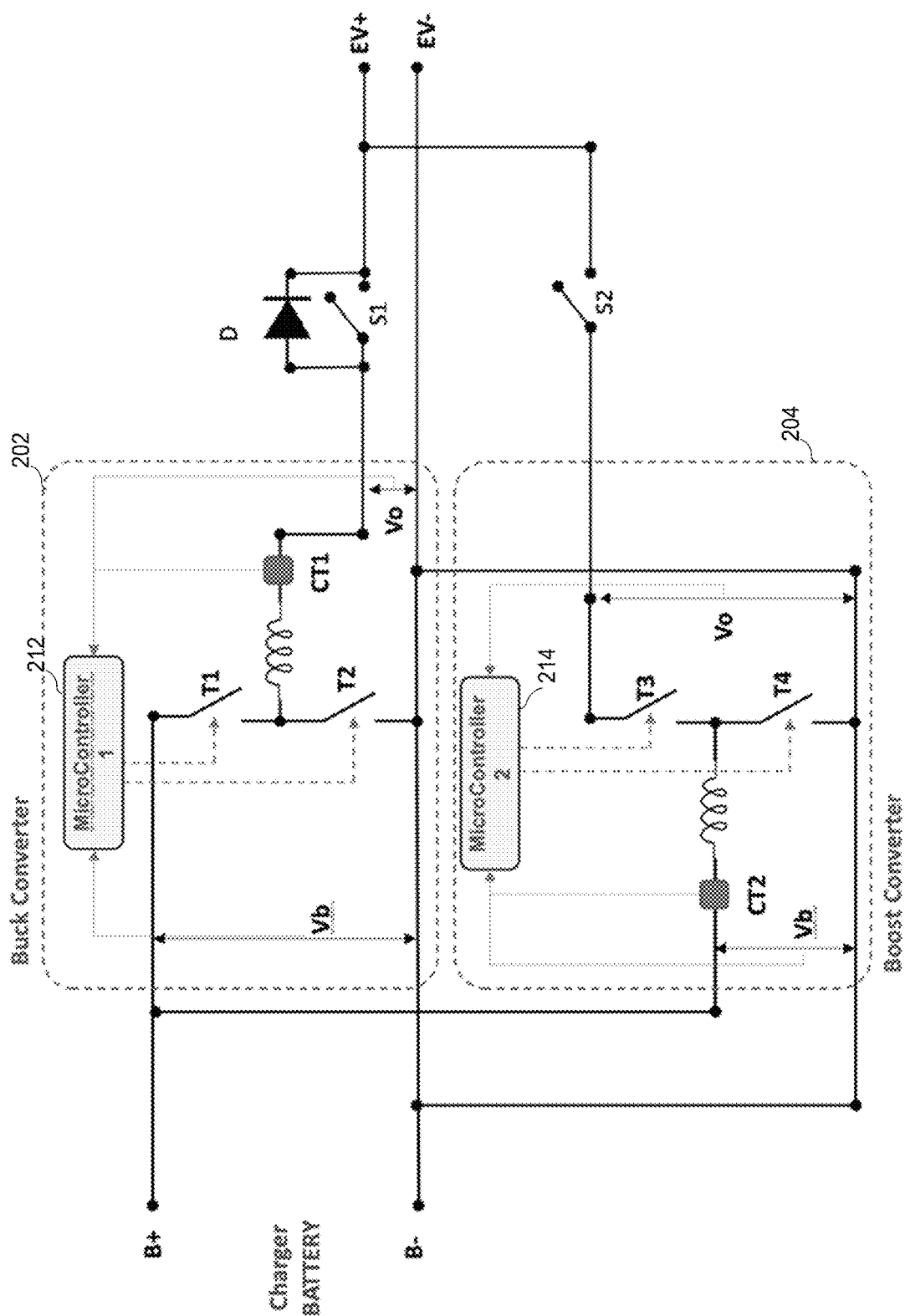
FIG. 3 illustrates the buck and boost converters of FIG. 2 in more detail.

Next, FIG. 3 illustrates an example circuitry of the buck converter 202 and the boost converter 204 in more detail. Microcontroller 1 (e.g., the controller 212 illustrated in FIG. 2) operates transistors T1 and T2 (or other suitable power switches) using a pulse width modulation (PWM) signal with a certain duty cycle. Microcontroller 1 controls the buck charging current in a closed loop by reading the analog value of a current sensor CT1. Microcontroller 1 also receives a measurement of input voltage Vb and output voltage Vo. Referring back to FIG. 2, the input voltage Vb corresponds to the voltage across the stationary batter 120, and the output voltage Vo corresponds to the voltage across the EV battery 122.

Similarly, microcontroller 2 operates transistors T3 and T4 (or other suitable power switches) using a PWM signal with a certain duty cycle. Microcontroller 2 controls the boost charging current in a closed loop by reading the analog value of a current sensor CT2. Similar to microcontroller 1, microcontroller 2 receives a measurement of input voltage Vb and output voltage Vo.

Generally speaking, the buck converter 202 operates when input voltage Vb is greater than voltage Vo, while the boost converter 204 operates when voltage Vo is greater than input voltage Vb. The controller 210 triggers the transition from the buck and the boost mode when the buck converter 202 no longer can regulate the charging current due to high duty cycle or due to the voltage differential between the stationary battery 120 (=Vb) and the EV battery 122 (=Vo) dropping below a certain threshold value.

Now referring to FIGS. 4 and 5, an example algorithm for controlling the charging current, which can be implemented in the system controller 210 (or partially in the system controller 210, and partially in the controllers 212 and 214, for example) is discussed next. This algorithm can be implemented for example as a set of instructions stored on a non-transitory computer-readable medium and executed by one or more processors. For clarity, the method 500 of FIG. 5 is discussed below with reference to the system controller 210 and the instructions which the system controller 210 provides to the buck controller 212 and the boost controller 214. In other implementations, however, the control logic can be implemented in a single controller or, conversely, more than three controllers. The control logic in general can be distributed among any suitable number of control modules, in any suitable manner.

At block 502, the controller operates the buck converter at a fixed switching frequency. As illustrated in FIG. 4 on a buck PWM duty cycle timeline, during an interval 420, the buck converter produces pulses 410 at a fixed switching frequency. As the voltage differential between the source battery (e.g., the stationary battery 120) and the target battery (e.g., the EV battery 122) decreases, the duty cycle of the pulses increases. In this example, the duty cycle increases from 94% to 95%, then to 96%, then to 97%, etc. The interval 420 can be referred to as the first operational mode of the circuit 124.

As a more particular example, the system controller 210 can provide instructions to the buck controller 212, which in turn can generate a fixed switching frequency PWM signal to the transistors T1 and T2 (see FIG. 3) to thereby regulate the buck charging current 402 and maintain the buck charging current at a certain approximately constant value. As discussed above, the buck controller 212 can regulate the buck charging current 402 in a closed loop using the current transducer CT1.

At block 504, the system controller 210 determines whether the voltage differential between the source battery and the target battery has reached a certain threshold (e.g., 10y), and/or that the duty cycle of the buck converter exceeds a threshold duty cycle value (e.g., 98%). The flow returns to block 502 if the one or more thresholds have not been reached. Otherwise, at block 506, the system controller 210 determines that a first trigger event 430 has occurred, and instructs the buck controller 212 to start operating at a variable switching frequency. This control strategy allows the circuit 124 to achieve a higher resolution of the PWM duty cycle for values closer to 100%. This in turn allows continual regulation of the buck charging current.

Figure 4:
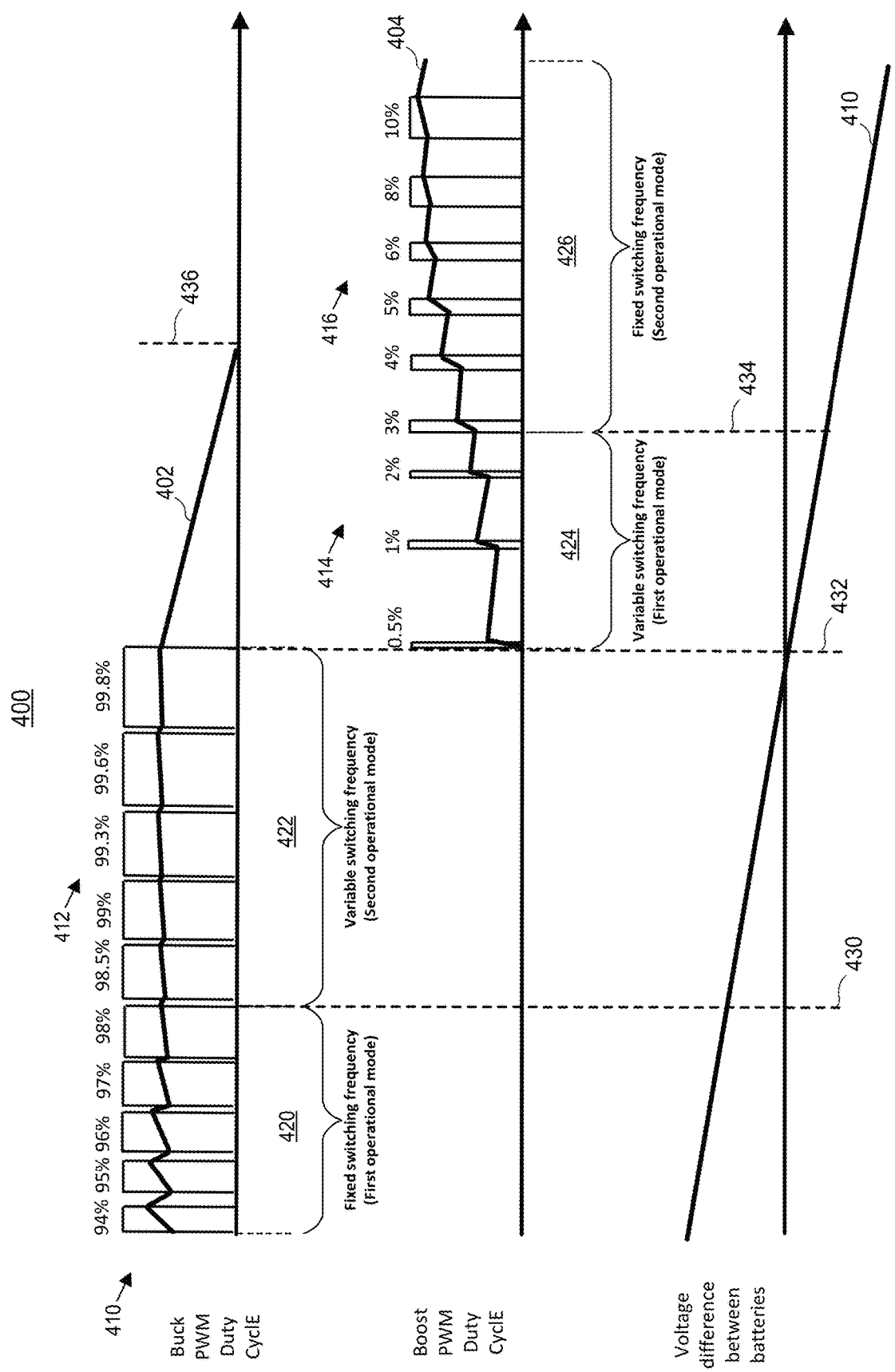
FIG. 4 illustrates example operation of the circuit of FIG. 2.
Figure 5:
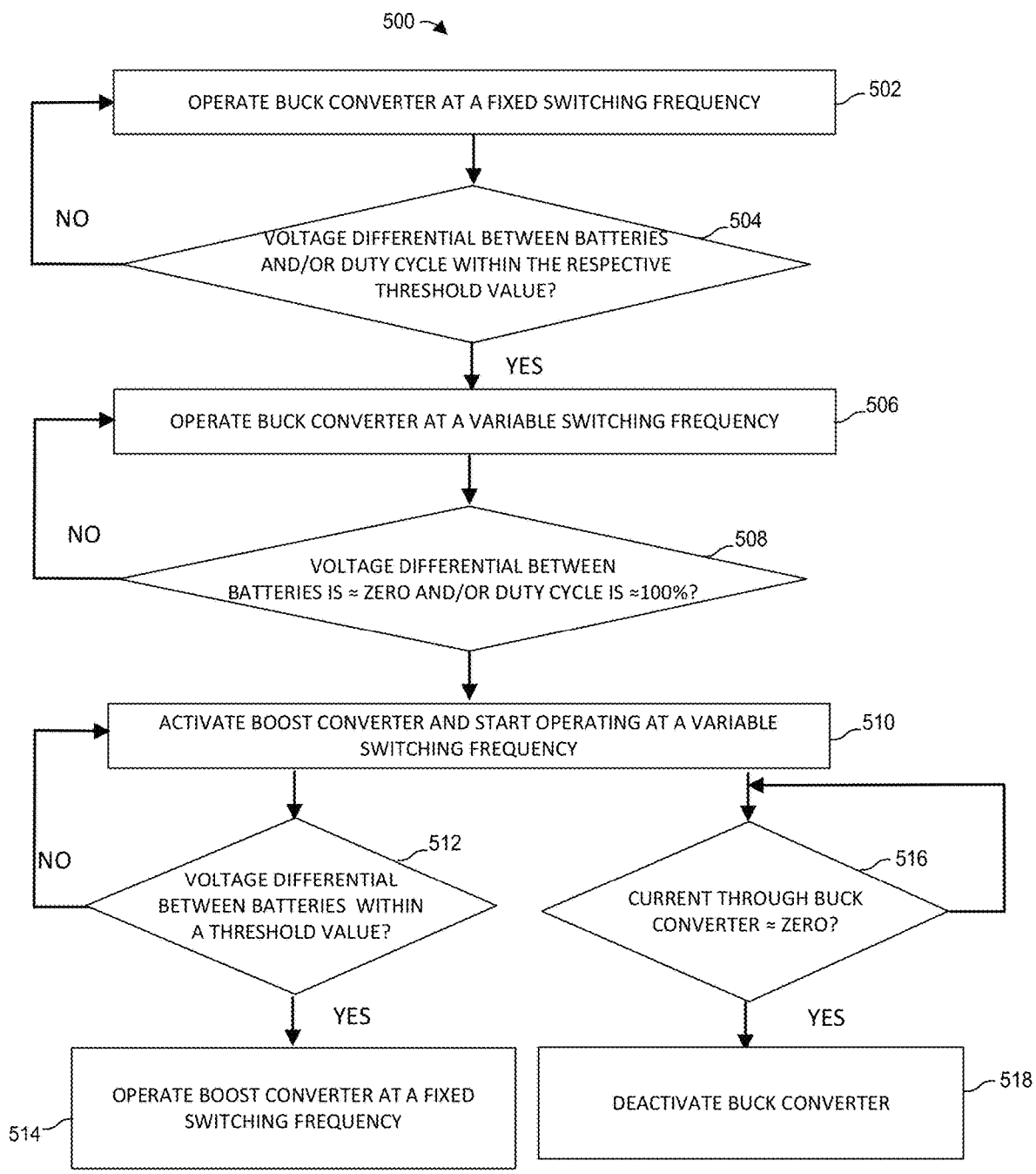
FIG. 5 is a flow diagram of an example method for controlling a charging current while transferring energy from a source energy storage device to a target energy storage device.

As illustrated in FIG. 4, during an interval 422, the buck converter produces pulses 412 at a variable switching frequency with example duty cycles 98.5%, 99%, 99.3%, etc. The interval 422 can be referred to as the second operational mode of the circuit 124.

At block 506, the system controller 210 determines whether the voltage differential between the source battery and the target battery has gone to substantially zero, and/or whether the buck duty cycle has reached 100%. If the system controller 210 determines that one or both of these thresholds have been reached, the system controller 210 determines that a second trigger event 432 has occurred, and the flow proceeds to block 510. Otherwise, the flow returns to block 506.

In other words, the trigger event 432 indicates to the system controller 210 that the buck charging current can no longer be regulated. The system controller 210 accordingly instructs the boost controller 214 to close the switch S2 (i.e., transition to the ON state), and thus cause the boost converter to start supplying a charging current 404 to the target battery. As illustrated in FIG. 4, during an interval 424 (block 510 in FIG. 5), both the buck converter and the boost converter provide charging currents 402 and 404, respectively, to the target battery. However, the buck charging current 402 gradually and relatively slowly decays to zero, while the boost current 404 gradually and relatively slowly rises from zero to the desired reference value.

During the interval 424, the boost controller can use variable switching frequency to enable minimal duty cycle values of the PWM signal to the transistors T3 and T4 (see FIG. 3) to regulate the boost charging current 404 to the difference between the desired charging current and the decaying buck current 402. Pulses 414 occurring in the interval 424 in this example scenario have duty cycles of 0.5%, 1%, 2%, etc.

At block 512, the system controller 210 determines whether the voltage differential between the source battery and the target battery has reached a certain threshold (which can be the same threshold or a different threshold as the one used at block 504). If the system controller 210 determines that the threshold has been reached, the system controller 210 determines that a third trigger event 434 has occurred, and the flow proceeds to block 514. Otherwise, the flow returns to block 510. In other words, when the voltages across the source battery and the target battery are sufficiently far apart, the boost converter increases the switching frequency to a regular operating level, which may be a few hundreds of KHz. The boost converter can maintain the regulation of the boost current 404 using feedback from the current transducer CT2 (see FIG. 3).

Thus, at block 514, the system controller 210 can instruct the boost controller to begin operating a fixed switching frequency. Example pulses 416 during an interval 426 have example duty cycles of 3%, 4%, 5%, etc., with rising edges occurring at a fixed frequency.

At block 516, which can be executed in parallel with blocks 512/514, the system controller 210 determines whether the current buck converter is substantially zero (see event 436 in FIG. 4). If the buck charging current 402 has decayed to zero, the system controller 210 can open the switch S1 and thus disconnect the buck converter, at block 518. The boost controller and the boost converter as a result regulate all of the charging current flowing to the target battery after event 316, and the voltage differential between the source battery and the target battery at this point starts to increase.

The following additional considerations apply to the foregoing discussion.

These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include read-only memory (ROM) or random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

What is claimed is:

1. A circuit for controlling a charging current while transferring energy from a source battery to a target battery in an electric vehicle (EV), the system comprising:
    a buck converter configured to couple to the source battery and the target battery;
    a boost converter configured to couple to the source battery and the target battery;
    a boost switch that connects an output to the boost converter to the target battery in a closed state, and disconnects the boost converter from the target battery in an open state; and
    control circuitry configured to:
        (i) operate the buck converter at a fixed switching frequency in a first operational mode,
        (ii) in response to detecting a first trigger event, transition from the first operational mode to a second operational mode to operate the buck converter at a variable switching frequency, and
        (iii) in response to detecting a second trigger event, transition to a third operational mode to activate the boost converter.

2. The circuit of claim 1, wherein the control circuitry is further configured to:
    after transitioning to the third operational mode, regulate a charging current through the boost converter so as to substantially compensate for a differential between a desired charging current and a decaying current through the buck converter.

3. The circuit of claim 1, wherein to detect the first trigger event, the control circuitry is configured to determine that a voltage differential between the source battery and the target battery is below a threshold voltage value.

4. The circuit of claim 1, wherein to detect the first trigger event, the control circuitry is configured to determine that a duty cycle of the buck converter exceeds a threshold duty cycle value.

5. The circuit of claim 1, wherein the control circuitry is further configured to:
    upon transitioning to the third operational mode, operate the boost converter at a variable switching frequency; and
    in response to detecting a third trigger event, transition from the third operational mode to a fourth operational mode to operate the boost converter at a fixed switching frequency.

6. The circuit of claim 5, wherein to determine the third trigger event, the control circuitry is configured to:
    determine that a voltage differential between the source battery and the target battery is below a second threshold voltage value.

7. The circuit of claim 1, wherein the control circuitry is further configured to:
    subsequently to transitioning to the fourth operational mode and in response to determining that no current flows through the buck converter, deactivate the buck converter.

8. A system comprising:
    a source battery;
    a buck converter configured to couple to the source battery and a target battery in an electric vehicle (EV);
    a boost converter configured to couple to the source battery and the target battery;
    a boost switch that connects an output to the boost converter to the target battery in a closed state, and disconnects the boost converter from the target battery in an open state; and
    control circuitry configured to:
        (i) operate the buck converter at a fixed switching frequency in a first operational mode,
        (ii) in response to detecting a first trigger event, transition from the first operational mode to a second operational mode to operate the buck converter at a variable switching frequency, and
        (iii) in response to detecting a second trigger event, transition to a third operational mode to activate the boost converter.

* * * * *